(12) United States Patent
Dell'Anno et al.

(10) Patent No.: US 9,071,386 B2
(45) Date of Patent: Jun. 30, 2015

(54) SYSTEM AND METHOD FOR COMMUNICATION

(71) Applicant: General Electric Company, Schenectady, NY (US)

(72) Inventors: Michael Joseph Dell'Anno, Clifton Park, NY (US); Richard Louis Zinser, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 49 days.

(21) Appl. No.: 14/089,836

(22) Filed: Nov. 26, 2013

(65) Prior Publication Data

US 2015/0017942 A1   Jan. 15, 2015

Related U.S. Application Data

(60) Provisional application No. 61/844,144, filed on Jul. 9, 2013.

(51) Int. Cl.
| | |
|---|---|
| *H04K 3/00* | (2006.01) |
| *H04B 1/00* | (2006.01) |
| *H04B 15/00* | (2006.01) |
| *H04B 1/12* | (2006.01) |
| *H01Q 1/32* | (2006.01) |
| *H01Q 3/26* | (2006.01) |

(52) U.S. Cl.
CPC ............... *H04K 3/20* (2013.01); *H04B 1/126* (2013.01); *H04K 3/228* (2013.01); *H04K 2203/32* (2013.01); *H01Q 1/3275* (2013.01); *H01Q 3/2629* (2013.01)

(58) Field of Classification Search
USPC .............. 455/1, 63.1, 63.4, 296; 342/14, 16
See application file for complete search history.

(56) References Cited

U.S. PATENT DOCUMENTS

| | | | |
|---|---|---|---|
| 4,275,397 | A | 6/1981 | Gutleber |
| 4,780,721 | A | 10/1988 | Dobson |
| 5,152,010 | A | 9/1992 | Talwar |
| 5,175,558 | A | 12/1992 | DuPree |
| 5,579,016 | A | 11/1996 | Wolcott et al. |
| 5,704,557 | A | 1/1998 | Hallett et al. |
| 5,825,898 | A | 10/1998 | Marash |
| 6,486,828 | B1 * | 11/2002 | Cahn et al. .................. 342/363 |
| 6,704,557 | B1 * | 3/2004 | Krishnamurthy et al. . 455/278.1 |
| 8,055,184 | B1 * | 11/2011 | DiMartino et al. ............... 455/1 |
| 8,199,681 | B2 | 6/2012 | Zinser et al. |
| 8,379,584 | B2 | 2/2013 | Hartman |
| 2011/0249596 | A1 | 10/2011 | Ross |

* cited by examiner

*Primary Examiner* — Nguyen Vo
(74) *Attorney, Agent, or Firm* — Nitin N. Joshi

(57) ABSTRACT

A communication system includes an omnidirectional antenna to receive a wideband primary signal, a nulling antenna to receive a secondary signal and a controller. The nulling antenna is oriented to place a null in a direction of a desired communication signal and the controller subtracts a processed secondary signal from a processed wideband primary signal to produce a jamming cancelled signal.

20 Claims, 4 Drawing Sheets

SYSTEM AND METHOD FOR COMMUNICATION

CROSS REFERENCE TO RELATED APPLICATIONS

The present application claims priority to U.S. provisional patent application Ser. No. 61/844,144 filed Jul. 9, 2013, incorporated herein by reference in its entirety.

BACKGROUND

Embodiments of the present invention relate to a communication system and more specifically to a method for cancelling radio frequency (RF) interference.

RF interference may be classified in two categories, intentional and unintentional. Intentional RF interference also referred to as "radio jamming" is a deliberate attempt by a third party to disrupt communications between two parties. The third party generates interfering radio frequency signals in an area where the two parties are communicating. The interfering radio frequency signals may be at the same frequency as that of the frequency being used by the two parties in communication. On the other hand, unintentional RF interference or jamming occurs when someone unaware of communications between the two parties generates radio frequency signals that interfere with communication between the two parties. Examples of unintentional jamming include interference from non-communication devices such as medical equipment.

In military application, canceling RF interference is of utmost importance so that the missions will not be compromised. There are many hardware as well as software based techniques to cancel the RF interference. One of the techniques to cancel RF interference is to use a directional antenna system. In the directional antenna system, the antennas are oriented to minimize the power of the undesired transmitter, while maximizing the signal power of the desired transmitter.

While the performance of directional antennas may be satisfactory in some cases, there are many cases where they may not provide performance sufficient to overcome the deleterious effects of the jammer. Thus, there is always a need for even better, RF interference suppression techniques to combat improvements in RF interference techniques.

BRIEF DESCRIPTION

In accordance with an embodiment of the present technique, a communication system is presented. The communication system includes an omnidirectional antenna to receive a wideband primary signal and a nulling antenna oriented to place a null in a direction of a desired communication signal and to receive a secondary signal. The communication system also includes a controller to subtract a processed secondary signal from a processed wideband primary signal to produce a jamming cancelled signal.

In accordance with another embodiment of the present technique, a method of communication is presented. The method includes receiving a wideband primary signal by an omnidirectional antenna and orienting a nulling antenna to place a null in a direction of a desired communication signal to receive a secondary signal. The method also includes processing the secondary signal and the wideband primary signal and subtracting a processed secondary signal from a processed wideband primary signal to produce a jamming cancelled signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As used herein, the terms "controller" or "module" refers to software, hardware, or firmware, or any combination of these, or any system, process, or functionality that performs or facilitates the processes described herein.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present technique allow the cancellation of remote transmitter/jammer signals through the use of a nulling antenna. The nulling antenna is oriented to place a null in a direction of a desired communication signal, and the output is connected to a Division Free Duplex (DFD) radio frequency (RF) canceller transmitter input port (TIP) which receives a waveform with very little of the desired communication signal present. An omnidirectional antenna is co-sited and connected to a receiver input port (RIP). The omnidirectional antenna receives both the jammer signal and the remote desired communication signal. Although, the embodiments have been disclosed with respect to non-cooperative jamming cancelation in a military application, the embodiments are equally applicable to other applications such as cooperative or unintentional jamming for both military and civilian use.

Figure 1:
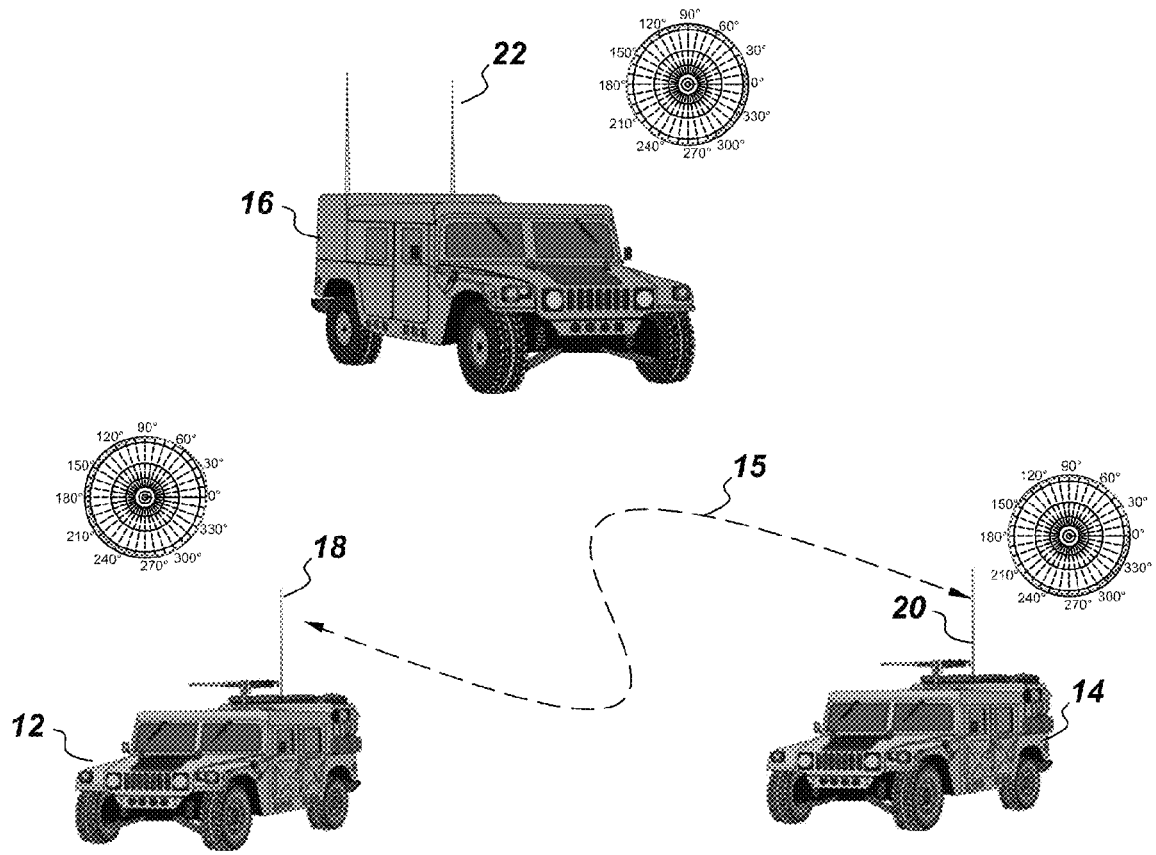
FIG. 1 is a graphical illustration of a typical scenario of a non-cooperative jamming.

FIG. 1 shows a graphical illustration 10 of a typical scenario of a non-cooperative jamming In the illustration 10, two Vehicles 12 and 14 both having at least one omnidirectional antenna 18 or 20 are attempting to communicate in the presence of a jammer 16. Vehicles 12, 14 both may have a transmitter and a receiver and thus may be capable of transmitting or receiving a desired or useful communication signal 15. Jammer 16 is also equipped with an omnidirectional antenna 22 and is located nearby vehicles 12, 14. As shown, jammer 16 is trying to send a jamming signal so as to interfere or jam a communication between vehicles 12 and 14. In an embodiment, the jamming is considered successful if the jamming signal transmitted by jammer 16 is more powerful (i.e., higher decibel (dBm) level) at the locations of vehicle 12 and vehicle 14 than the desired communication signals 15 transmitted by vehicles 14 and 12, respectively.

Figure 2:
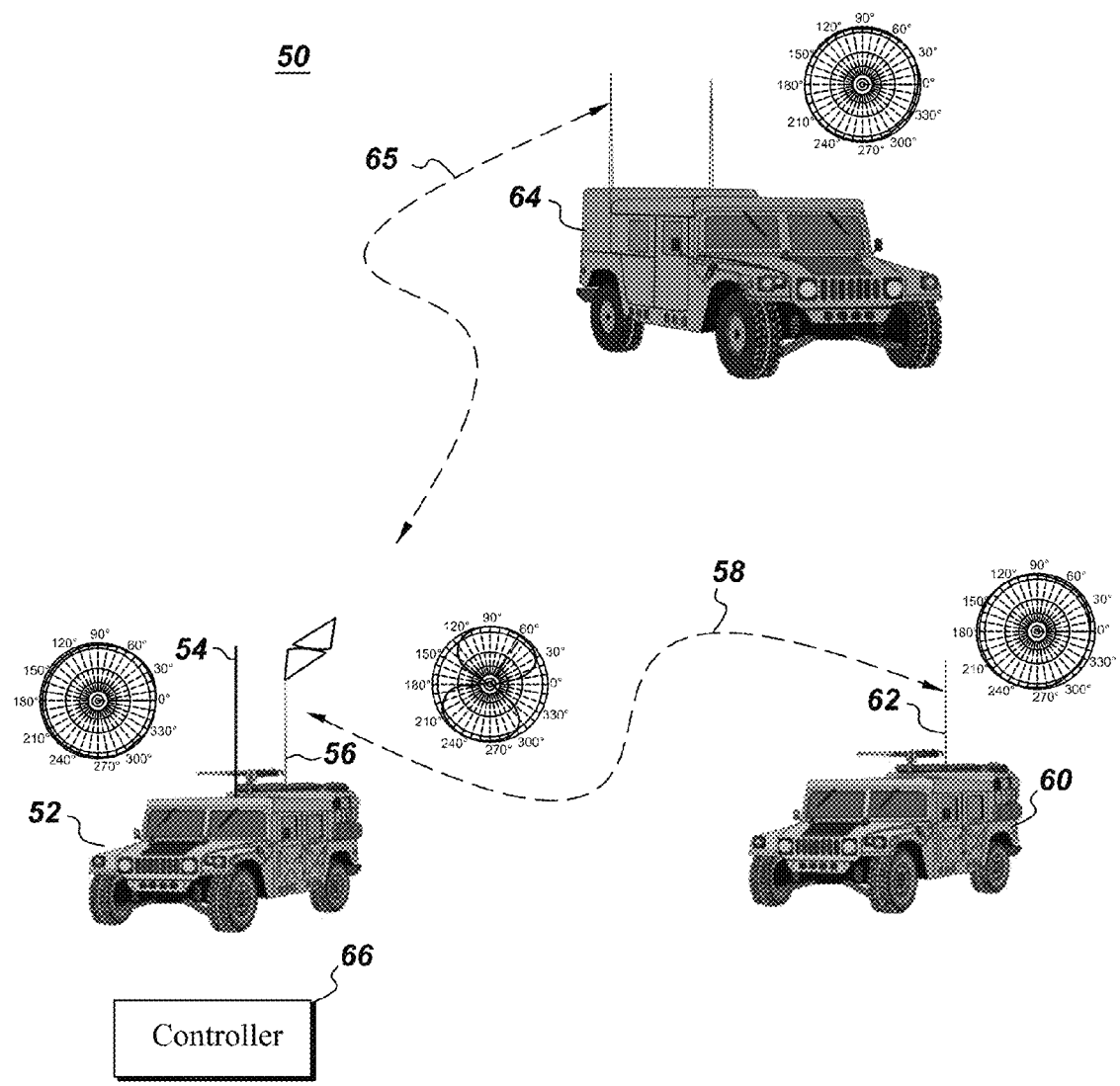
FIG. 2 is a graphical illustration of a jammer cancelation scenario in accordance with an embodiment of the present technique.

FIG. 2 shows a graphical illustration 50 of a jammer signal cancelation scenario in accordance with an embodiment of the present technique. In the illustration 50, a vehicle 52 is trying to receive a desired communication signal 58 from another vehicle 60 in presence of a jammer 64, which as in the earlier case, is trying to jam the communication between vehicles 52 and 60. Vehicle 52 is equipped with a nulling antenna 54 oriented in a direction of desired communication signal 58. It should be noted that, in one embodiment not only the signals received by nulling antenna 54 and omnidirectional antenna 56 would be different but even the strength of signals received by them would be different. For example, omnidirectional antenna 56 will receive a wideband primary signal whereas since nulling antenna 54 is oriented towards desired communication signal 58, nulling antenna 54 will receive a secondary signal which includes no or very low signal power desired communication signal. In one embodiment, the wideband primary signal comprises all incoming communication signals at the location of vehicle 52 including desired communication signal 58 and jamming signal 65. Vehicle 60 includes an omnidirectional antenna 62 to transmit desired communication signal 58 to vehicle 52.

A controller 66 on vehicle 52 receives both, the wideband primary signal and the secondary signal comprising no or very low strength desired communication signal. Controller 66 further processes the wideband primary signal and the secondary signal and provides a jamming cancelled signal to vehicle 52 by subtracting a processed secondary signal from a processed wideband primary signal. In one embodiment, processing the wideband primary signal and the secondary signal includes converting both signals into digital signals, adding a delay in the wideband primary signal and filtering the secondary signal.

In one embodiment, nulling antenna 54 may include active or passive designs. The passive design may create a null (lower gain in a single or multiple directions) based upon its physical construction. Furthermore, the passive design nulling antenna may be rotated and configured with polarization to change the direction and type of the null provided. The active design nulling antenna may include either multiple discrete antennas or multiple integrated antennas with adjustable radio frequency (RF) phase shifting components at each antenna. The phase shifting function changes the arrival time of a signal to enable the addition or cancellation of the signals to create a dynamic directional null.

It should be noted that if jammer 64 is coaxial or in line with vehicles 60 and 52 then the nulling antenna may null out both the jamming signal 65 and the desired communication signal 58. However, this issue can be mitigated by changing the geometry. In other words, since both vehicle 60 and 52 are mobile either one of them can be moved to make jammer 64 out of line with vehicle 60.

Figure 3:
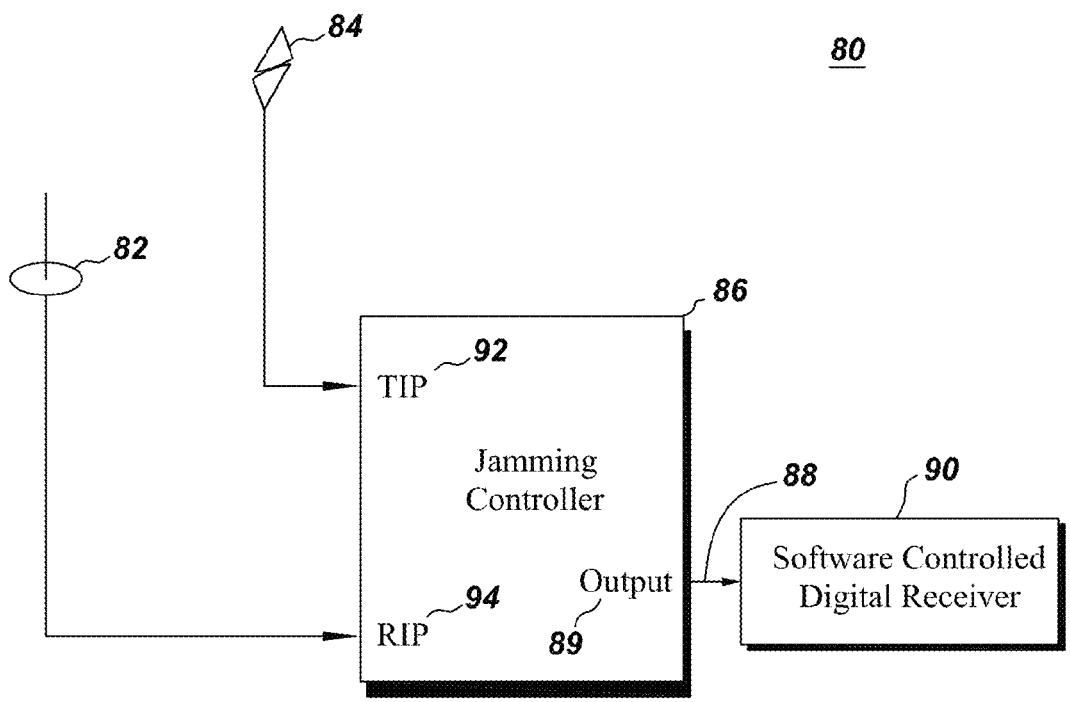
FIG. 3 is a graphical illustration of a communication system utilized in a vehicle in accordance with an embodiment of the present technique.

FIG. 3 shows a graphical illustration of a communication system 80 utilized in a vehicle in accordance with an embodiment of the present technique. Communication system 80 includes an omnidirectional antenna 82 to receive a wideband primary signal, a nulling antenna 84 oriented towards the desired communication signal to receive a secondary signal and a jamming controller 86 which generates a jamming cancelled signal 88 at output terminal 89. The resulting jamming cancelled signal 88 from jamming controller 86 may then be input to a software-controlled digital receiver 90 and may be further processed in any suitable manner. In one embodiment, software-controlled digital receiver 90 removes other undesirable signals from jamming cancelled signal 88.

In one embodiment, the output of nulling antenna 84 is connected to a transmitter input port (TIP) 92 of jamming controller 86 and output of omnidirectional antenna 82 is connected to a receiver input port (RIP) 94 of jamming controller 86. In general, it is desirable to minimize the presence of received desired communication signal present at the TIP. The architecture shown in FIG. 3 facilitates having higher jammer signal level than the desired communication signal level at TIP 92. In one embodiment, the jammer-to-desired-signal ratio (JSR) at TIP 92 must be at least 4 dB higher than the JSR at RIP 94 to provide effective cancellation of the jamming signal at RIP 94. In other words, advantageously in an embodiment of the present technique, a nulling antenna with less than 30 dB of attenuation of the desired signal may also yield good results for jamming signal cancellation.

Figure 4:
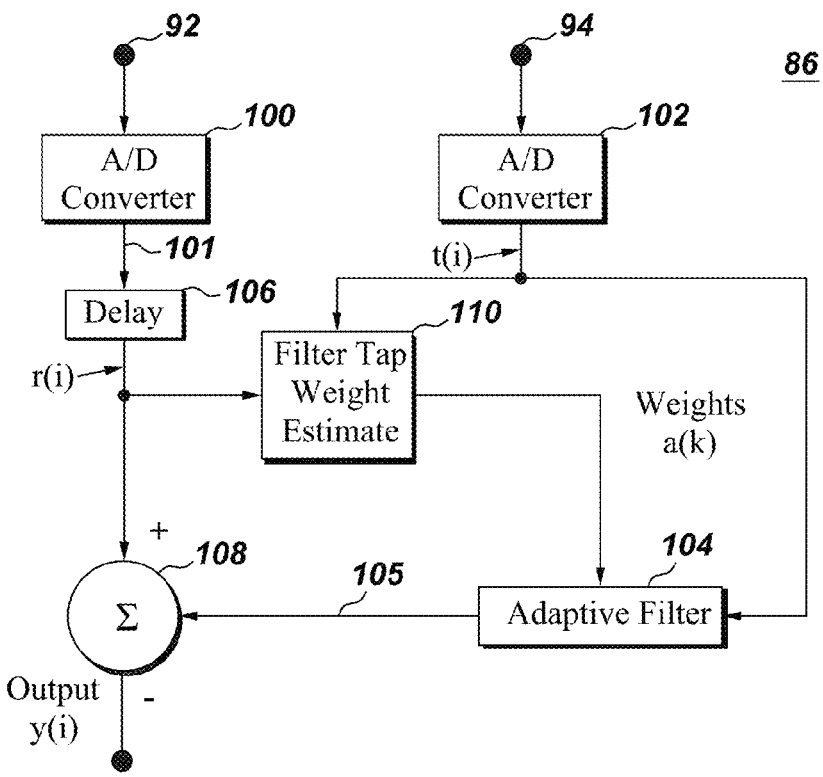
FIG. 4 is a detailed block diagram of a jamming controller of FIG. 3 in accordance with an embodiment of the present technique.

FIG. 4 shows a detailed block diagram of a jamming controller 86 of FIG. 3 in accordance with an embodiment of the present technique. As described with respect to FIG. 3, the wideband primary signal is received at RIP 92 and the secondary signal comprising no or very less strength desired communication signal is received at TIP 94. A first analog to digital (A/D) converter 100 and a second analog to digital converter 102 convert the wideband primary signal and secondary signal into a digital wideband primary signal 101 and a digital secondary signal t(i) respectively. Furthermore, digital secondary signal t(i) is filtered by an adaptive filter 104 and the digital wideband primary signal 101 is delayed by a delay block 106. A filtered secondary signal 105 is then subtracted from a delayed wideband primary signal r(i) by a subtraction block 108 to generate a jamming cancelled signal. In one embodiment, a delay time for delay block 106 is chosen to compensate for any sampling misalignment between the two A/D converters. In another embodiment, a delay equal to about one half of a filter length is chosen, as it centers an impulse response of the filter, creating a more linear phase characteristic for the filter.

In one or more embodiments, first analog to digital converter 100 or second analog to digital converter 102 may be a single A/D converter, e.g., a high-speed 14-bit A/D converter. In general, adaptive filtering in adaptive filter 104 involves changing filter parameters over time, to adapt to changing signal characteristics. In one embodiment, adaptive filter 104 may include a finite impulse response (FIR) adaptive filter. In another embodiment, a filter tap weight estimator 110 may be utilized to estimate and update filter parameters for adaptive filter 104. In other words, filter tap weight estimator 110 periodically provides filter tap weight values to adaptive filter 104. In the embodiment shown, filter tap weight estimator 110 provides the filter tap weight values based on two input signals, delayed wideband primary signal r(i) and digital secondary signal t(i). Adaptive filter 104 provides an estimate of the secondary signal that may be subtracted from the received wideband primary signal with subtraction block 108 to provide the jamming cancelled signal. The resulting jamming cancelled signal may then be input to a software-controlled digital receiver 90 (FIG. 3) and may be further processed in any suitable manner.

In one embodiment, the subtraction block difference equation is given by:

$$y(i) = r(i) - \Sigma_{k=0}^{M-1} a(k) t(i-k) \quad (1)$$

where y(i) are the output samples, r(i) are the delayed wideband primary signal samples (also known as the primary input signal), t(i) are the digital secondary signal samples, M is the length of the adaptive filter, and a(k) are the adaptive filter tap weights. The filter tap weights can be estimated by solution of the following matrix equation:

$$\begin{bmatrix} R_{tt}(0,0) & R_{tt}(0,1) & \ldots & R_{tt}(0,M-1) \\ R_{tt}(1,0) & R_{tt}(1,1) & \ldots & T_{tt}(1,M-1) \\ \ldots & \ldots & \ldots & \ldots \\ R_{tt}(M-1,0) & R_{tt}(1,M-1) & \ldots & R_{tt}(M-1,M-1) \end{bmatrix} \begin{bmatrix} a(0) \\ a(1) \\ \ldots \\ a(M-1) \end{bmatrix} = \begin{bmatrix} R_{tr}(0) \\ R_{tr}(1) \\ \\ R_{tr}(M-1) \end{bmatrix} \quad (2)$$

where $$R_{tt}(j,k) = \sum_{i=M-1}^{N-1} t(i-j)t(i-k) \quad (3)$$

and $$R_{tr}(k) = \sum_{i=M-1}^{N-1} r(i)t(i-k) \quad (4)$$

and N is the length of the samples over which to estimate the filter tap weights.

Figure 5:
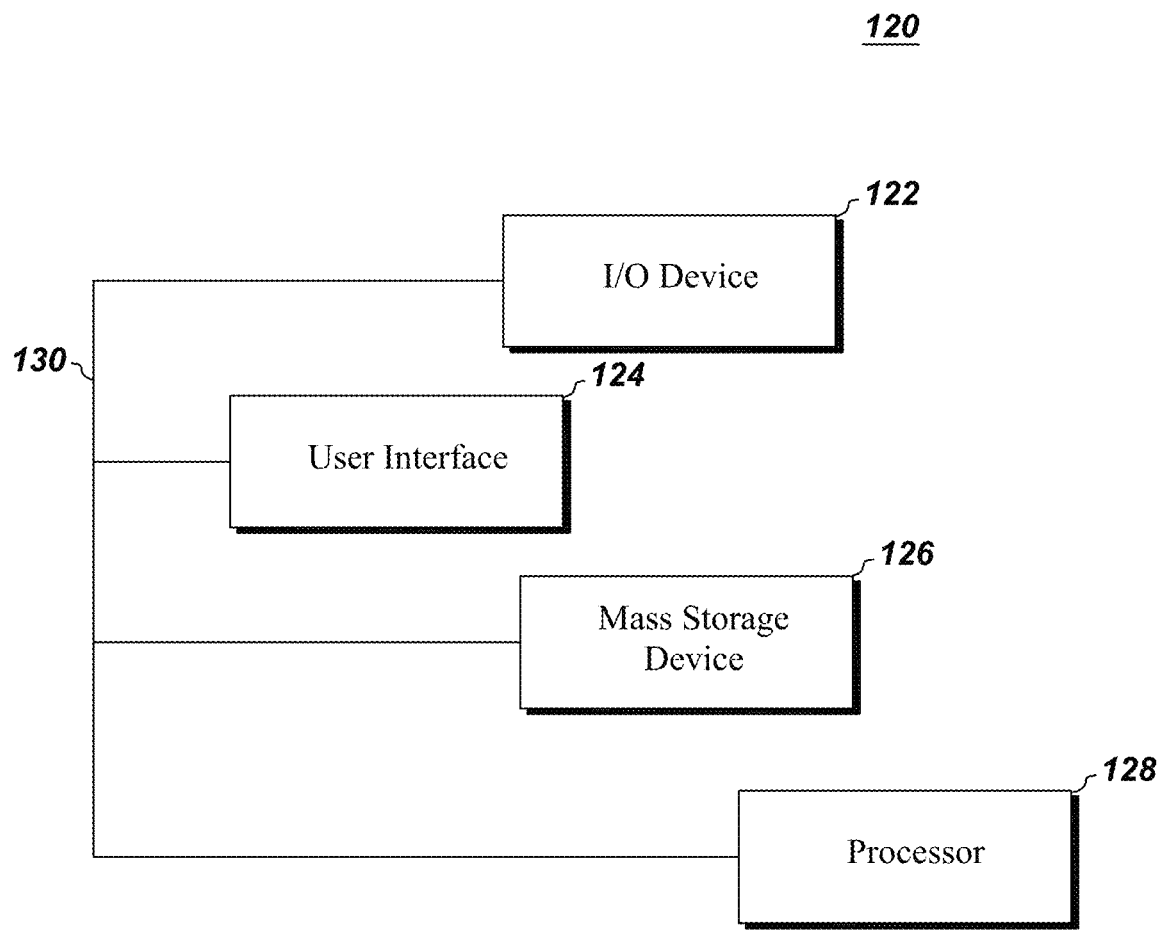
FIG. 5 is a hardware system which may be used in conjunction with the present technique.

FIG. 5 illustrates one embodiment of a hardware system 120 intended to represent a broad category of computer systems such as personal computers, workstations, and/or embedded systems that may be used in conjunction with the present techniques. In embodiments, it is envisioned that communication system 80 (FIG. 3) may include an external control that may include certain hardware and software components for implementing the present techniques, including control of the individual components of system 80. In the illustrated embodiment, hardware system 120 includes processor 128 and mass storage device 126 coupled to high speed bus 130. A user interface device 124 may also be coupled to high speed bus 130. User interface devices 124 may include a display device, a keyboard, one or more external network interfaces, etc. An input/output device 122 may also be coupled to high speed bus 130. In an embodiment, the user interface, for example the display, may communicate certain information related to the status of the operation of the adaptive filter. For example, the display may display information relating to the quality of the jamming signal cancellation.

Advantages of the present technique include superior performance over conventional solutions and an inexpensive antennas implementation. For example, in one embodiment, an effective jammer cancellation efficacy of 80 dB may be obtained using a 30 dB gain nulling antenna. Furthermore, the present technique eliminates the need to locate the jamming signal and only uses the directional information for the desired transmitter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A communication system comprising:
   an omnidirectional antenna to receive a wideband primary signal;
   a nulling antenna oriented to place a null in a direction of a desired communication signal and to receive a secondary signal;
   a controller to subtract a processed secondary signal from a processed wideband primary signal to produce a jamming cancelled signal.

2. The communication system of claim 1, wherein the nulling antenna includes a passive design nulling antenna or an active design nulling antenna.

3. The communication system of claim 2, wherein the active design nulling antenna includes multiple discrete antennas or multiple integrated antennas with adjustable radio frequency (RF) phase shifting components at each antenna.

4. The communication system of claim 1, wherein the processed secondary signal includes a filtered secondary signal and the processed wideband primary signal includes a delayed wideband primary signal.

5. The communication system of claim 4, wherein the controller comprises a first analog to digital converter to convert the wideband primary signal into a digital wideband primary signal.

6. The communication system of claim 5, wherein the controller comprises a delay module to generate the delayed wideband primary signal from the digital wideband primary signal.

7. The communication system of claim 6, wherein the controller comprises a second analog to digital converter to convert the secondary signal into a digital secondary signal.

8. The communication system of claim 7, wherein the controller comprises a digital adaptive filter to generate the filtered secondary signal from the digital secondary signal.

9. The communication system of claim 8, wherein the controller comprises a filter tap weight estimator to determine filter weights for the digital adaptive filter based on the delayed wideband primary signal and the digital secondary signal.

10. The communication system of claim 1, wherein the nulling antenna is connected to a transmitter input port and the omnidirectional antenna is connected to a receiver input port of a duplex communication system.

11. A method of communication comprising:
    receiving a wideband primary signal by an omnidirectional antenna;
    orienting a nulling antenna to place a null in a direction of a desired communication signal to receive a secondary signal;
    processing the secondary signal and the wideband primary signal; and
    subtracting a processed secondary signal from a processed wideband primary signal to produce a jamming cancelled signal.

12. The method of claim 11, wherein the secondary signal includes no or very low signal power of the desired communication signal.

13. The method of claim 11, wherein when the nulling antenna, a jammer signal and the desired communication signal are coaxial, moving the desired communication signal out of the line with respect to the nulling antenna and the jammer signal.

14. The method of claim 11, wherein processing the secondary signal includes filtering the secondary signal and processing the wideband primary signal includes delaying the wideband primary signal.

15. The method of claim 14, wherein delaying the wideband primary signal includes converting the wideband primary signal into a digital wideband primary signal.

16. The method of claim 15, wherein processing the secondary signal includes converting the secondary signal into a digital secondary signal.

17. The method of claim 16, wherein delaying the wideband primary signal includes providing a delay time so as to allow for sampling misalignment of the digital wideband primary signal and the digital secondary signal.

18. The method of claim 17, wherein filtering the secondary signal comprises generating a filtered secondary signal from the digital secondary signal using a digital adaptive filter.

19. The method of claim 18, wherein the delay time is set to be about one-half of a length of the digital adaptive filter.

20. The method of claim 19, further comprising determining filter weights for the digital adaptive filter based on the delayed wideband primary signal and the digital secondary signal.

* * * * *